(12) United States Patent
Hasegawa

(10) Patent No.: US 9,195,902 B2
(45) Date of Patent: Nov. 24, 2015

(54) STRAIGHT LINE DETECTION APPARATUS AND STRAIGHT LINE DETECTION METHOD

(75) Inventor: Hiromu Hasegawa, Osaka (JP)

(73) Assignee: MegaChips Corporation, Osaka-shi (JP)

(*) Notice: Subject to any disclaimer, the term of this patent is extended or adjusted under 35 U.S.C. 154(b) by 0 days.

(21) Appl. No.: 14/232,803

(22) PCT Filed: Jul. 6, 2012

(86) PCT No.: PCT/JP2012/067333
§ 371 (c)(1),
(2), (4) Date: Jan. 14, 2014

(87) PCT Pub. No.: WO2013/008746
PCT Pub. Date: Jan. 17, 2013

(65) Prior Publication Data
US 2014/0161349 A1    Jun. 12, 2014

(30) Foreign Application Priority Data

Jul. 14, 2011 (JP) ................................ 2011-155847
Jul. 28, 2011 (JP) ................................ 2011-165281

(51) Int. Cl.
*G06K 9/36* (2006.01)
*G06K 9/46* (2006.01)
(Continued)

(52) U.S. Cl.
CPC ............ *G06K 9/4633* (2013.01); *G06T 7/0085* (2013.01); *G06T 11/001* (2013.01); *G06T 2207/20061* (2013.01)

(58) Field of Classification Search
USPC ......... 382/281, 202, 276, 287, 248, 131, 137, 382/162; 250/201.2, 201.3, 208.1, 307, 250/548, 559.3; 73/597, 602; 348/207.2, 348/207.99; 358/1.18
See application file for complete search history.

(56) References Cited

U.S. PATENT DOCUMENTS 6,107,637 A * 8/2000 Watanabe et al. .......... 250/559.3
6,157,737 A   12/2000 Ishikawa et al. ............. 382/195
(Continued)

FOREIGN PATENT DOCUMENTS

JP    9 128547    5/1997
JP    10 283476   10/1998
(Continued)

OTHER PUBLICATIONS

U.S. Appl. No. 14/240,912, filed Feb. 25, 2014, Hasegawa.
(Continued)

*Primary Examiner* — Anh Do
(74) *Attorney, Agent, or Firm* — Oblon, McClelland, Maier & Neustadt, L.L.P

(57) ABSTRACT

To detect a straight line using the Hough transform taking into consideration not only the number of points but also other properties of the straight line, the Hough transform unit performs a Hough transform on contour-enhanced binary image data. The Hough table stores a count after the Hough transform. The adjustment unit adjusts the count. The straight line detection unit detects a straight line based on the adjusted count. Additionally, to detect a straight line, independent of its direction or location in the image, for each straight line in the binary image data, the straight line calculation unit determines the intersections where that straight line cuts up the binary image data to calculate the intersection distance. The normalization unit divides the count stored in the Hough table by the intersection distance to normalize the count. The straight line detection unit detects a straight line based on the normalized count.

32 Claims, 8 Drawing Sheets

(51) Int. Cl.
  *G06T 11/00* (2006.01)
  *G06T 7/00* (2006.01)

(56) References Cited

U.S. PATENT DOCUMENTS

| | | | |
|---|---|---|---|
| 7,065,237 B2* | 6/2006 | Murakami | 382/137 |
| 7,692,144 B2* | 4/2010 | Watanabe et al. | 250/307 |
| 8,256,295 B2* | 9/2012 | Suetoshi et al. | 73/597 |
| 8,587,818 B2* | 11/2013 | Imaizumi et al. | 358/1.18 |
| 2002/0181756 A1 | 12/2002 | Shibuya et al. | 356/237.4 |
| 2005/0168731 A1 | 8/2005 | Shibuya et al. | 356/237.4 |
| 2006/0238755 A1 | 10/2006 | Shibuya et al. | 382/141 |
| 2006/0239536 A1 | 10/2006 | Shibuya et al. | 702/183 |
| 2009/0080699 A1 | 3/2009 | Ng-Thow-Hing et al. | 382/103 |
| 2009/0105990 A1 | 4/2009 | Shibuya et al. | 702/183 |
| 2009/0263023 A1 | 10/2009 | Iwamoto | 382/199 |

FOREIGN PATENT DOCUMENTS

| | | |
|---|---|---|
| JP | 11 66302 | 3/1999 |
| JP | 2003 59984 | 2/2003 |
| JP | 2006 107034 | 4/2006 |
| JP | 2010 161694 | 7/2010 |
| JP | 2010 541065 | 12/2010 |
| JP | 2013206067 * | 10/2013 ............... G06T 7/60 |
| WO | 2007 138858 | 12/2007 |

OTHER PUBLICATIONS

International Search Report Issued Aug. 7, 2012 in PCT/JP12/067333 Filed Jul. 6, 2012.

Extended European Search Report issued Apr. 29, 2015 in Patent Application No. 12810658.0.

Klaus Hansen, et al., "Understanding the Hough transform: Hough cell support and its utilisation" Image and Vision Computing, vol. 15, No. 3, XP055183335, 1997, pp. 205-218.

Richard O. Duda, et al., "Use of the Hough Transformation to Detect Lines and Curves in Pictures" Communications of the ACM, Association for Computing Machinery, Inc., vol. 15, No. 1, XP000575329, 1972, pp. 11-15.

M.K. Ibrahim, et al, "Weighted Hough Transform" Intelligent Robots and Computer Vision X: Algorithms and Techniques, vol. 1607, XP055183679, 1991, pp. 237-241.

Daisuke Ishii, et al., "A Study on Control Parameters of Frame Separation Method for Comic Images", IEICE technical report, The Institute of Electronics, Information and Communication Engineers, May 21, 2009, vol. 109, No. 65, pp. 187-192.

* cited by examiner

STRAIGHT LINE DETECTION APPARATUS AND STRAIGHT LINE DETECTION METHOD

TECHNICAL FIELD

The present invention relates to techniques for detecting a straight line contained in an image.

BACKGROUND ART

The Hough transform may be used to detect a straight line contained in an image. A line that passes through an arbitrary point in an image with an X-Y coordinate system is converted to coordinates (θ,ρ) in the Hough space. The number of straight lines that can be converted to a particular set of coordinates (θ,ρ) in the Hough space are counted using a two-dimensional array [θ][ρ]. Based on the value sets of coordinates (θ,ρ) with a count larger than a predetermined threshold in the two-dimensional array [θ][ρ], a straight line in the X-Y coordinate system is detected.

In Patent Document 1, specified below, an image is divided into subareas by using the Hough transform to detect a line segment in the image. In Patent Document 2, also specified below, an attempt is made to optimize the sampling interval for the parameters θ and ρ in the Hough space depending on the length of a straight line. In Patent Document 3, specified below, the Hough transform is also used to detect a line segment contained in an image.

PRIOR ART DOCUMENTS

Patent Documents

Patent Document 1: JP Hei10 (1998)-283476 A
Patent Document 2: JP Hei11 (1999)-66302 A
Patent Document 3: JP 2006-107034 A

SUMMARY OF THE INVENTION

Problems to be Solved by the Invention

In a method of detecting a straight line using the Hough transform, the number of points present on the straight line in the X-Y coordinate system is focused on. The more the number of points present on the same straight line, the more likely the straight line will be detected as such. That is, whether the straight line is detected as such is solely dependent on the number of points present on the straight line.

However, a user using the image may find some straight lines in the image important, and others less important. Some straight lines should be taken into consideration even though they have a small number of points, and others are of less interest even though they have a relatively large number of points.

Further, if the above detection method is used, a straight line that generally extends in a horizontal direction can be easily detected in an image with a larger horizontal dimension than its vertical dimension; conversely, a straight line that generally extends in a vertical direction may not be detected as such in the case of a small count even if the density is relatively large.

Furthermore, straight lines adjacent the corners of the image have small lengths and are thus even less likely to be detected as such.

Means to Solve the Problems

A straight line detection apparatus of the present invention includes: a Hough transform part configured to convert a straight line that passes through an arbitrary point in a specified image to a value set of coordinates (θ,ρ) in a Hough space by representing an arbitrary straight line in the specified image using a length ρ of a perpendicular extending from a reference point of the specified image to the arbitrary straight line in the specified image and an angle θ formed by the perpendicular with a reference axis that passes through the reference point; a counting part configured to count the number of conversions by the Hough transform part for each value set of coordinates (θ,ρ) in the Hough space; an adjustment part configured to adjust the count for each value set of coordinates (θ,ρ) by means of weighting depending on at least one of ρ and θ; and a detection part configured to detect the straight line in the specified image by identifying a value set of coordinates (θ,ρ) for which the adjusted count exceeds a first threshold.

The above straight line detection apparatus of the present invention is capable of detecting a straight line after performing weighting depending on the distance between the straight line and the origin. In other implementations, the straight line detection apparatus of the present invention is capable of detecting a straight line after performing weighting depending on the slope of the straight line. In still other implementations, the straight line detection apparatus of the present invention is capable of detecting a straight line after performing weighting depending on both the distance between the straight line and origin and the slope of the straight line.

Another straight line detection apparatus of the present invention includes: a Hough transform part configured to convert a straight line that passes through an arbitrary point in a specified image to a value set of coordinates (θ,ρ) in a Hough space by representing an arbitrary straight line in the specified image using a length ρ of a perpendicular extending from a reference point of the specified image to the arbitrary straight line in the specified image and an angle θ formed by the perpendicular with a reference axis that passes through the reference point; an intersection distance calculation part configured to determine points of intersection where a straight line in the specified image corresponding to an arbitrary value set of coordinates (θ,ρ) in the Hough space crosses the periphery of the specified image and calculate the distance between these points of intersection; a normalization part configured to count the number of conversions by the Hough transform part for each value set of coordinates (θ,ρ) in the Hough space and normalize the count for each value set of coordinates (θ,ρ) using a corresponding intersection distance to calculate a normalized count; and a detection part configured to detect the straight line in the specified image by identifying a value set of coordinates (θ,ρ) for which the normalized count exceeds a first threshold.

A still another straight line detection apparatus of the present invention includes: an aspect ratio conversion part configured to perform aspect ratio conversion to convert the aspect ratio of a specified image to 1:1 to generate a square image; a Hough transform part configured to convert a straight line that passes through an arbitrary point in the square image to a value set of coordinates (θ,ρ) in a Hough space by representing an arbitrary straight line in the square image using a length ρ of a perpendicular extending from a reference point of the square image to the arbitrary straight line in the square image and an angle θ formed by the perpendicular with a reference axis that passes through the reference point; and a detection part configured to count the number of conversions by the Hough transform part for each value set of coordinates (θ,ρ) in the Hough space and detect the straight line in the square image by identifying a value set of coordinates (θ,ρ) for which the count for that value set of coordinates (θ,ρ) exceeds a first threshold.

The above straight line detection apparatus of the present invention is capable of detecting a straight line based on information produced from the Hough transform independent of the direction or location of the straight line and using similar standards. It solves the problem with an image with an aspect ratio other than 1:1 where it is difficult to detect a straight line in a vertical or horizontal direction. It also prevents a straight line near a corner of the image from being left undetected.

A straight line detection method of the present invention includes: a Hough transform step to convert a straight line that passes through an arbitrary point in a specified image to a value set of coordinates (θ,ρ) in a Hough space by representing an arbitrary straight line in the specified image using a length ρ of a perpendicular extending from a reference point of the specified image to the arbitrary straight line in the specified image and an angle θ formed by the perpendicular with a reference axis that passes through the reference point; a counting step to count the number of conversions in the Hough transform step for each value set of coordinates (θ,ρ) in the Hough space; an adjustment step to adjust the count for each value set of coordinates (θ,ρ) by means of weighting depending on at least one of ρ and θ; and a detection step to detect the straight line in the specified image by identifying a value set of coordinates (θ,ρ) for which the adjusted count exceeds a first threshold.

Another straight line detection method of the present invention includes: a Hough transform step to convert a straight line that passes through an arbitrary point in a specified image to a value set of coordinates (θ,ρ) in a Hough space by representing an arbitrary straight line in the specified image using a length ρ of a perpendicular extending from a reference point of the specified image to the arbitrary straight line in the specified image and an angle θ formed by the perpendicular with a reference axis that passes through the reference point; an intersection distance calculation step to determine points of intersection where a straight line in the specified image corresponding to an arbitrary value set of coordinates (θ,ρ) in the Hough space crosses the periphery of the specified image and calculate the distance between these points of intersection; a normalization step to count the number of conversions in the Hough transform step for each value set of coordinates (θ,ρ) in the Hough space and normalize the count for each value set of coordinates (θ,ρ) using a corresponding intersection distance to calculate a normalized count; and a detection step to detect the straight line in the specified image by identifying a value set of coordinates (θ,ρ) for which the normalized count exceeds a first threshold.

A still another straight line detection method of the present invention includes: a conversion step to perform aspect ratio conversion to convert the aspect ratio of a specified image to 1:1 to generate a square image; a Hough transform step to convert a straight line that passes through an arbitrary point in the square image to a value set of coordinates (θ,ρ) in a Hough space by representing an arbitrary straight line in the square image using a length ρ of a perpendicular extending from a reference point of the square image to the arbitrary straight line in the square image and an angle θ formed by the perpendicular with a reference axis that passes through the reference point; and a detection step to count the number of conversions in the Hough transform step for each value set of coordinates (θ,ρ) in the Hough space and detect the straight line in the square image by identifying a value set of coordinates (θ,ρ) for which the count for that value set of coordinates (θ,ρ) exceeds a first threshold.

An object of the present invention is to provide a technique to detect a straight line, taking into consideration not only the number of points but also other properties of the straight line. Another object of the present invention is to provide a technique to detect a straight line independent of the direction or location of the straight line and using similar standards.

The objects, features, aspects and advantages of the present invention will be made clear by the following detailed description and attached drawings.

EMBODIMENTS FOR CARRYING OUT THE INVENTION

First Embodiment 1-1. Overall Flow of Process

Figure 1:
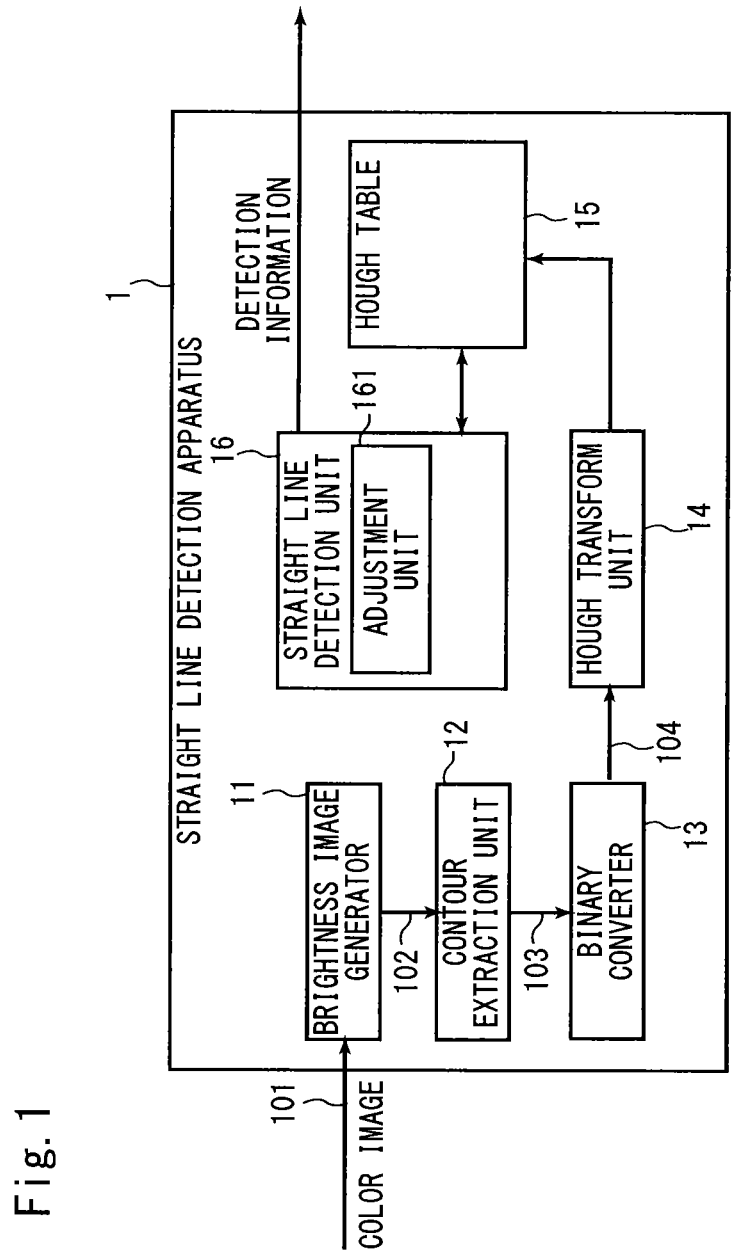
FIG. 1 is a block diagram of a straight line detection apparatus according to a first embodiment.

FIG. 1 is a block diagram of a straight line detection apparatus 1 according to a first embodiment. The straight line detection apparatus 1 includes a brightness image generator 11, contour extraction unit 12, binary converter 13, Hough transform unit 14, Hough table 15, and straight line detection unit 16.

In the present embodiment, the brightness image generator 11, contour extraction unit 12, binary converter 13, Hough transform unit 14 and straight line detection unit 16 are implemented by hardware circuitry. Alternatively, these functional units may be implemented by a CPU and software running on the CPU.

The brightness image generator 11 receives color image data 101. The color image data 101 may be, for example, an image captured by an imaging device, not shown. The color image data 101 may be, for example, image data of a YCbCr color space or RGB color space. Based on the color image data 101, the brightness image generator 11 generates brightness image data 102. For example, if the color image data 101 is image data of YCbCr color space, the brightness image generator 11 extracts Y signals to generate brightness image data 102.

The contour extraction unit 12 receives the brightness image data 102. Based on the brightness image data 102, the contour extraction unit 12 generates the contour image data 103. In the present embodiment, the contour extraction unit 12 uses a Sobel filter to perform contour extraction. A Sobel filter detects a contour using first space derivation. The contour extraction unit 12 outputs an absolute value of the filter output, which is treated as the strength of a line segment. The present embodiment is not limited to a particular filter. For example, a Laplacian filter may be used.

The binary converter 13 receives the contour image data 103. Based on the contour image data 103, the binary converter 13 generates binary image data 104. The contour image data 103 is gray-scale image data. The binary converter 13 converts the value of each pixel in the contour image data 103 to zero or one based on a predetermined threshold.

The Hough transform unit 14 receives the binary image data 104. The Hough transform unit 14 performs a Hough transform on the binary image data 104 and writes the result into the Hough table 15. More specifically, the Hough transform unit 14 stores the result of a Hough transform into a two-dimensional array $[\rho][\theta]$. The process of the Hough transform will be described in detail further below.

The straight line detection unit 16 includes an adjustment unit 161. The straight line detection unit 16 refers to the Hough table 15 and detects a straight line contained in the binary image data 104. The process performed by the straight line detection unit 16, including the adjustment unit 161, will be described in detail further below.

1-2. Hough Transform

The process performed by the Hough transform unit 14 will be described in detail. For an arbitrary point contained in the binary image data 104, the Hough transform unit 14 converts lines that pass through that point to coordinates $(\theta,\rho)$ in the Hough space.

Figure 2:
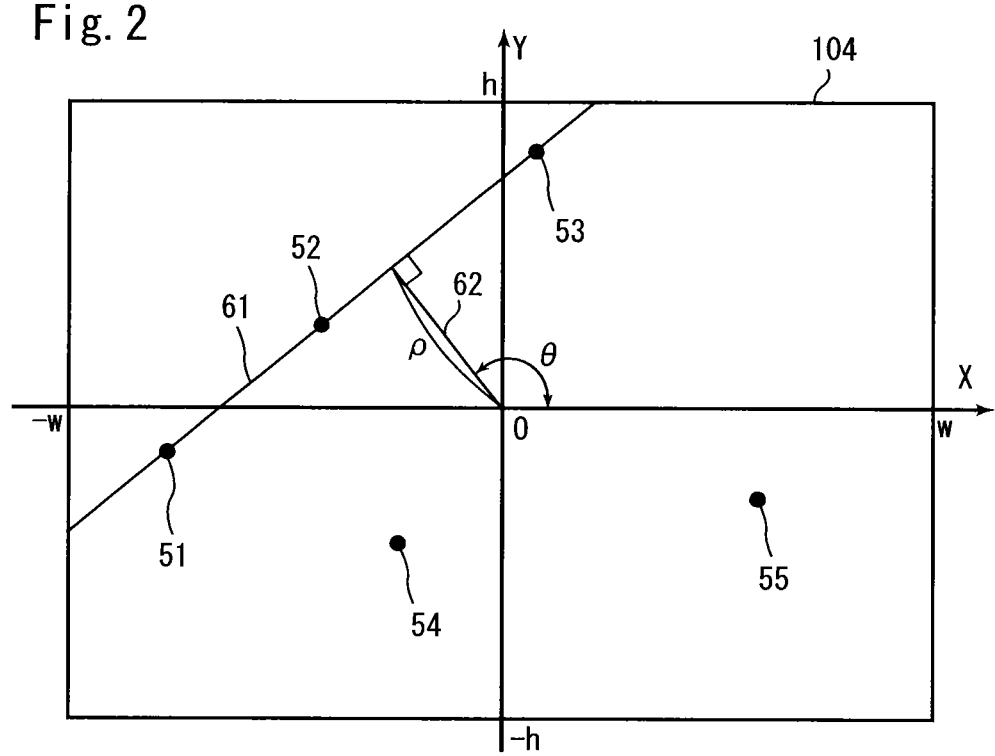
FIG. 2 is a graph illustrating how a straight line can be represented in binary image data.

FIG. 2 is a graph illustrating the binary image data 104. In the binary image data 104, the origin O and X and Y coordinates are defined, as shown in FIG. 2. FIG. 2 shows some of the points contained in the binary image data 104, designated by 51 to 55. As used herein, points contained in the binary image data 104 means points to which the pixel value "one" is assigned as a result of binary conversion. The straight line 61 that passes through the point 51 may be expressed in Equation 1, which uses $\theta$ and $\rho$:

[Equation 1]

$$x \cos \theta + y \sin \theta = \rho \quad (1)$$

In Equation 1, $\rho$ is the length of the perpendicular 62 extending from the origin to the straight line 61. $\theta$ is the angle formed by the perpendicular 62 with the positive direction of the X-axis.

Multiple straight lines that pass through the point 51 are possible. The number of straight lines that pass through the point 51 depends on the sampling interval of $\theta$ and $\rho$. Accordingly, a plurality of value sets of coordinates $(\theta,\rho)$ in the Hough space are associated with one point in the binary image data 104.

As shown in FIG. 2, the points 51 to 53 are arranged on one straight line. Straight lines passing through each of the points 52 and 53 are also converted to a plurality of value sets of coordinates $(\theta,\rho)$ in the Hough space. Then, based on all the points 51 to 53, the Hough transform is performed on the straight line 61, which is associated with the same value set of coordinates $(\theta,\rho)$.

Figure 3:
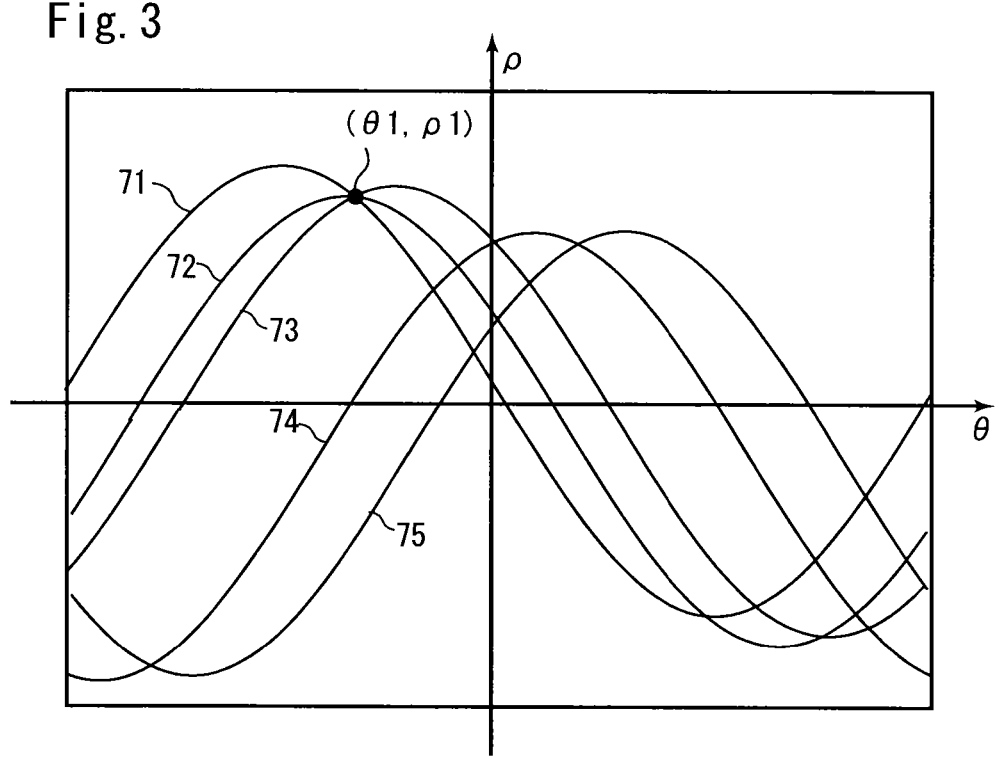
FIG. 3 is a graph illustrating a Hough space.

FIG. 3 is a graph illustrating a Hough space. Each of the sinusoidal curves 71 to 75 represents a collection of the points in the Hough space produced from the Hough transform of the corresponding one of the points 51 to 55. The coordinates $(\theta 1, \rho 1)$ where the sinusoidal curves 71 to 73 intersect corresponds to the straight line 61.

Thus, if a plurality of points are present on the same straight line in the binary image data 104, these points in the binary image are converted to the same point in the Hough space. The number of points that can be converted to each value set of coordinates $(\theta,\rho)$ in the Hough space is counted before the straight line is detected. The Hough table 15 contains a two-dimensional array $T[\theta][\rho]$. That is, the Hough transform is performed on every point of the binary image data 104 and the resulting counts are stored in the two-dimensional array $T[\theta][\rho]$.

1-3. Straight Line Detection

The straight line detection unit 16 refers to the Hough table 15 and detects a straight line contained in the binary image data 104. The straight line detection unit 16 does not use the results of conversion as generated by the Hough transform unit 14 to detect a straight line, but adjusts the contents of the Hough table 15 and detects a straight line. The adjustment process is performed by the adjustment unit 161.

The process performed by the adjustment unit 161 will be described. The adjustment unit 161 uses the function f(x) to adjust the counts in the two-dimensional array $T[\theta][\rho]$. The function f(x) is to weight a count in the two-dimensional array $T[\theta][\rho]$ depending on the distance $\rho$. The function f(x) takes $\rho$ as an input and outputs an adjustment factor $f(\rho)$. The adjustment factor $f(\rho)$ is a factor by which a count is multiplied.

For a large value of the function f(x), a count is highly evaluated. For example, adjustments are done to make it more likely that a straight line is detected even if the count is relatively small. For a small value of the function f(x), a count is lowly evaluated.

Figure 4:
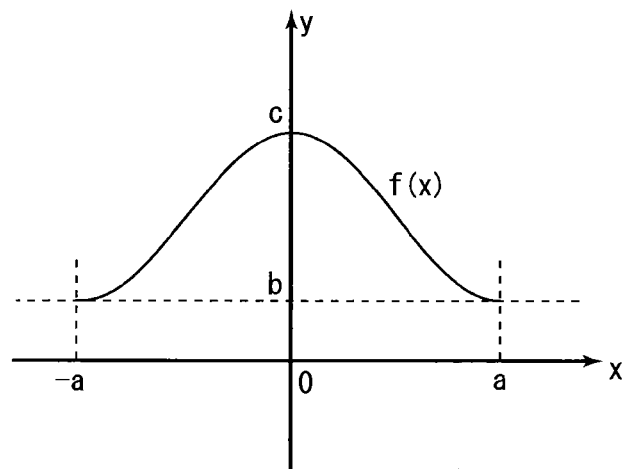
FIG. 4 is a graph illustrating a weighting function f(x) used to adjust a count depending on the distance ρ.

FIG. 4 is a graph illustrating the function f(x) according to the present embodiment. As shown, the function f(x) takes the maximum c for x=0, and has large values near x=0. As the value of x becomes farther from 0, the value of the function f(x) decreases, and is at the minimum b for x=a and x=−a.

Equation 2 shows the function f(x). The function f(x) is a quartic function of x, and takes the maximum c for x=0 and takes the minimum b for x=a and x=−a, as discussed above.

[Equation 2]

$$f(x) = \frac{(c-b)}{a^4}x^4 - \frac{2(c-b)}{a^2}x^2 + c \quad (2)$$

In Equation 2, a, b and c are constants that determine the properties of the function f(x). The adjustment properties of the adjustment unit 161 may be freely changed by changing the values of a, b and c. For example, a, b and c may take the values shown in Equation 3:

[Equation 3]

$$\begin{cases} a = \sqrt{w^2 + h^2} \\ b = 0.5 \\ c = 1.0 \end{cases} \quad (3)$$

In Equation 3, w is the horizontal dimension of the binary image 104, and h is the vertical dimension of the binary image 104 (see FIG. 2). That is, "a" represents the distance between the origin O and each corner of the binary image 104. As "a" is established as shown in Equation 3, the value of the function f(x) is the smallest at four corners of the binary image 104. That is, the weighting is the smallest for straight lines, of which distance from the origin O is a half value of a diagonal of the specified image (binary image). The weighting of a straight line becomes larger as the distance from the origin O becomes smaller. If b=0.5 and c=1.0, the maximum weight is twice the minimum weight.

As shown in Equation 4, the adjustment unit 161 multiplies the count for each value set of coordinates (θ,ρ) by the adjustment factor f(ρ) to obtain an adjusted count Tc[θ][ρ]:

[Equation 4]

$$Tc[\theta][\rho]=T[\theta][\rho]*f(\rho) \quad (4)$$

Thus, in the present embodiment, adjustments are performed to weight a count depending on the distance between the straight line and the origin. For example, in the example shown in FIG. 4 and Equation 2, adjustments are done such that a straight line with a small distance to the origin O is highly evaluated. Thus, straight line detection is possible with emphasis on straight lines passing through or near the center of the image.

Using the function f(x) shown in Equation 2, a straight line can be more easily detected for smaller distances from the origin. This is because the peak of the function f(x) is at x=0. Thus, if the peak is shifted in a direction of the x-axis, straight line detection is possible with emphasis on straight lines at a predetermined distance from the origin. The function f(x) shown in Equation 2 calculates an adjustment factor by which a count is multiplied; however, a function that calculates an adjustment factor that is added to a count may be used.

The straight line detection unit 16 refers to the Hough table 15 adjusted by the adjustment unit 161 and detects a straight line. The straight line detection unit 16 has a predetermined threshold used to determine a straight line (first threshold). The straight line detection unit 16 identifies, in the two-dimensional array [θ][ρ], a value set of coordinates (θ,ρ) that stores a count exceeding the first threshold. Based on the identified value set of coordinates (θ,ρ), the straight line detection unit 16 identifies a straight line contained in the binary image data 104. The straight line detection unit 16 outputs detection information.

Second Embodiment

Next, a second embodiment of the present invention will be described. The configuration of a straight line detection apparatus 1 of the second embodiment is the same as that of the first embodiment shown in FIG. 1. In the first embodiment, the adjustment unit 161 adjusts a count based on the distance ρ between the straight line and the origin. In the second embodiment, the adjustment unit 161 adjusts a count based on a value of θ (see FIG. 2) formed by the perpendicular 62 extending from the origin to the straight line with the positive direction of the x-axis. In the first embodiment, the adjustment unit 161 uses the function f(x) shown in FIG. 4 to adjust a count. In the second embodiment, the adjustment unit 161 uses a function g(x) shown in FIG. 5 to adjust a count. The function g(x) takes θ as an input and outputs an adjustment factor g(θ). The adjustment factor g(θ) is a factor by which a count is multiplied.

Figure 5:
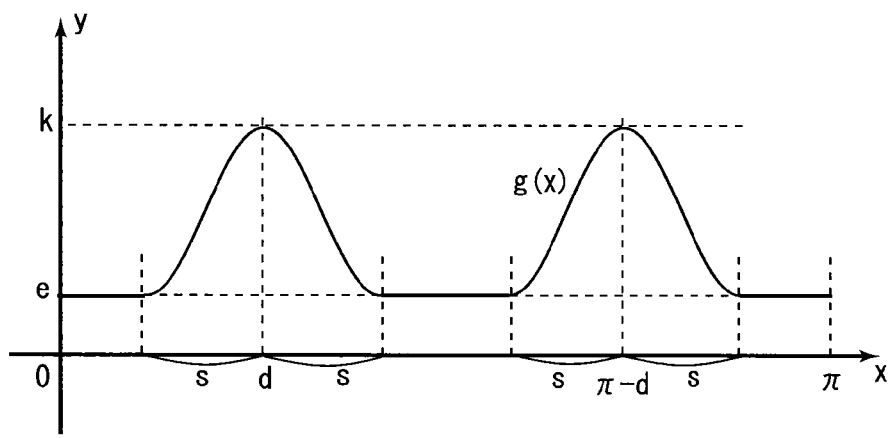
FIG. 5 is a graph illustrating a weighting function g(x) used to adjust a count depending on the angle θ.

As shown in FIG. 5, the function g(x) takes the maximum k at x=d and x=π−d, and has large values near x=d and x=π−d. Further, the function g(x) takes smaller values as the value of x becomes farther from d and π−d, and takes the minimum e at a point distant from the peak by s along the x-axis.

Equation 5 shows the function g(x). The function g(x) is defined in the domain from 0 to π, and is a combination of g(x)=e with a quartic function for x. With the property of g(x−π)=g(x), a weighting function with similar properties may be defined for a domain where θ is larger than π. Of course, a completely different function may be used in a domain where θ is larger than π.

[Equation 5]

$$g(x) = \begin{cases} = e & (0 \leq x < d-s) \\ = \frac{(k-e)}{s^4}(x-d)^4 - \frac{2(k-e)}{s^2}(x-d)^2 + k & (d-s \leq x < d+s) \\ = e & (d+s \leq x < \pi-d-s) \\ = \frac{(k-e)}{s^4}(x-d)^4 - \frac{2(k-e)}{s^2}(x-d)^2 + k & (\pi-d-s \leq x < -d+s) \\ = e & (\pi-d+s \leq x < \pi) \end{cases} \quad (5)$$

In Equation 5, d, s, e and k are constants that determine the properties of the function g(x). The adjustment properties of the adjustment unit 161 may be freely changed by changing the values of d, s, e and k. For example, d, s, e and k may take the values shown in Equation 6:

[Equation 6]

$$\begin{cases} d = -\frac{\pi}{6} \\ s = \frac{\pi}{12} \\ e = 0.5 \\ k = 1.0 \end{cases} \quad (6)$$

If d=π/6, as shown in Equation 6, detection is done with the greatest emphasis being on straight lines that are perpendicular to straight lines that form an angle of π/6 or 5π/6 with the positive direction of the x-axis. Then, if s=π/12, a count is highly evaluated in a domain where the slope of the perpendicular 62 changes from the peak by ±π/12. The evaluation of a count is the lowest in a domain where the slope of the perpendicular 62 changes form the peak by ±π/12 or larger. If e=0.5 and k=1.0, the maximum weight is twice the minimum weight.

As shown in Equation 7, the adjustment unit 161 multiplies the count of each value set of coordinates (θ,ρ) by the adjustment factor g(θ) to obtain an adjusted count Tc[θ][ρ]:

[Equation 7]

$$Tc[\theta][\rho]=T[\theta][\rho]*g(\theta) \quad (7)$$

Thus, in the present embodiment, a count is adjusted by weighting it depending on the slope of the straight line. For example, in the example shown in FIG. 5 and Equation 5, adjustments are done such that straight lines with two angles are highly evaluated. The angle of a straight line to be detected may be freely set by changing the value of d freely and shifting the peak along the x-axis.

Of course, the function g(x) shown in FIG. 5 and Equation 5 is merely an example. The function g(x) may be freely set depending on the purpose of detecting a straight line.

The straight line detection unit 16 refers to the Hough table 15 adjusted by the adjustment unit 161 and detects a straight line. The straight line detection unit 16 has a predetermined threshold used to determine a straight line (first threshold). The straight line detection unit 16 identifies, in the two-dimensional array [θ][ρ], a value set of coordinates (θ,ρ) that stores a count exceeding the first threshold. Based on the identified value set of coordinates (θ,ρ), the straight line detection unit 16 identifies a straight line contained in the binary image data 104. The straight line detection unit 16 outputs detection information.

Third Embodiment

Next, a third embodiment of the present invention will be described. The configuration of a straight line detection apparatus 1 of the third embodiment is the same as that of the first embodiment shown in FIG. 1. In the first embodiment, the adjustment unit 161 adjusts a count based on the distance ρ between the straight line and the origin. In the second embodiment, the adjustment unit 161 adjusts a count based on a value of θ formed by the perpendicular 62 extending from the origin to the straight line with the positive direction of the x-axis. The third embodiment is a combination of the first and second embodiments.

Equation 8 shows a method of adjusting/calculating a count in the third embodiment. That is, the adjustment unit 161 multiplies a count in the two-dimensional array [θ][ρ] by both adjustment factors f(ρ) and g(θ). Thus, a straight line may be detected by weighting both the distance from the origin and the slope of the straight line. For example, straight line detection is possible with emphasis on straight lines with a particular slope and at a particular distance from the origin.

[Equation 8]

$$Tc[\theta][\rho] = T[\theta][\rho] * f(\rho) * g(\theta) \tag{8}$$

{Variation 1}

In the first embodiment, the function f(x) with one peak for the distance ρ is used for adjustments. A function with two peaks for the distance ρ, such as the function g(x), may be used for adjustments. Alternatively, a weighting function with three or more peaks for the distance ρ may be used.

In the second embodiment, the function g(x) with two peaks for the angle θ is used for adjustments. A function with one peak for the angle θ, such as the function f(x), may be used for adjustments. Alternatively, a weighting function with three or more peaks for the angle θ may be used.

Fourth Embodiment

Figure 6:
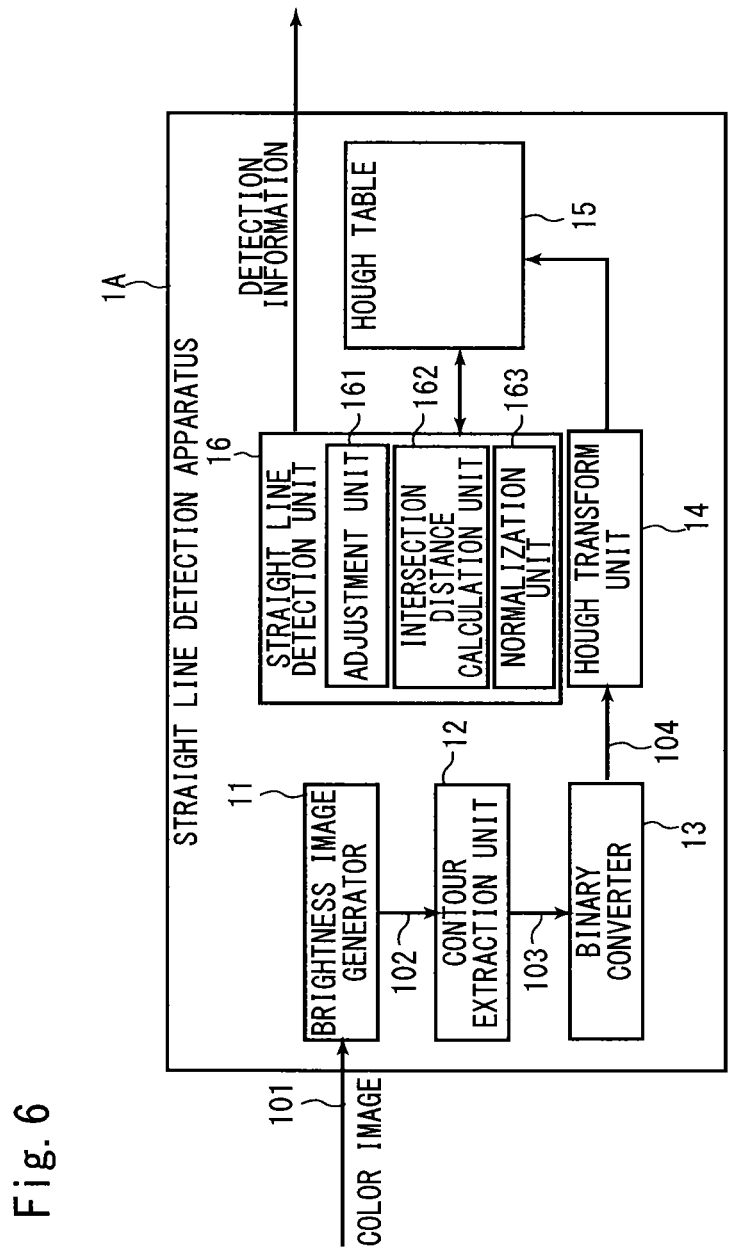
FIG. 6 is a block diagram of a straight line detection apparatus according to a fourth embodiment.

Next, a fourth embodiment of the present invention will be described. FIG. 6 is a functional block diagram of a straight line detection apparatus 1A according to the fourth embodiment. The configuration of the straight line detection apparatus 1A is different from the straight line detection apparatus 1 of the first embodiment shown in FIG. 1 in the configuration of the straight line detection unit 16.

The straight line detection unit 16 of the fourth embodiment includes, in addition to the adjustment unit 161, an intersection distance calculation unit 162 and a normalization unit 163. The other components and functions of the straight line detection apparatus 1A are the same as those of the first embodiment. That is, the functions of the brightness image generator 11, contour extraction unit 12, binary converter 13, Hough transform unit 14 and Hough table 15 are the same as those of the first embodiment.

The straight line detection unit 16 includes the adjustment unit 161, intersection distance calculation unit 162 and normalization unit 163. The straight line detection unit 16 refers to the Hough table 15 and detects a straight line contained in the binary image data 104. The straight line detection unit 16 does not use the results of conversion as produced by the Hough transform unit 14 to detect a straight line, but adjusts the contents of the Hough table 15 before detecting a straight line. The adjustments are done by the adjustment unit 161, as in the first embodiment; however, in the present embodiment, in addition to the adjustment unit 161, the intersection distance calculation unit 162 and normalization unit 163 are involved.

Figure 7:
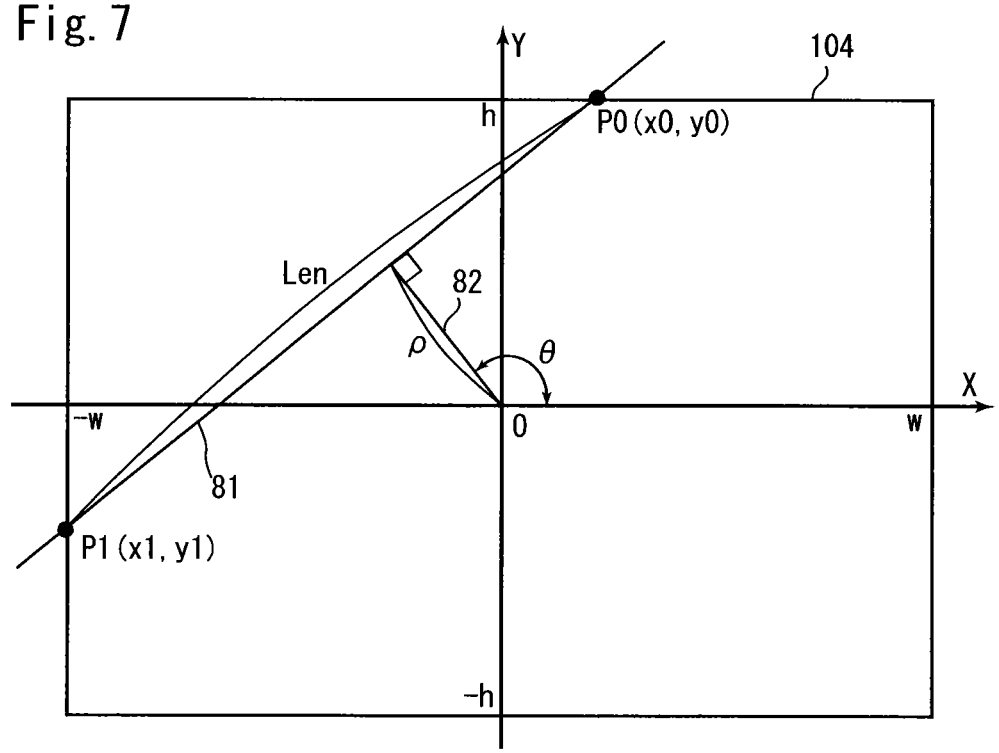
FIG. 7 is a graph illustrating a straight line that cuts up binary image data.

The process performed by the intersection distance calculation unit 162 will be described. FIG. 7 shows a straight line 81 contained in the binary image data 104. The length of the perpendicular 82 extending from the origin O to the straight line 81 is denoted by ρ. The angle formed by the perpendicular 82 with the positive direction of the X-axis is denoted by θ.

In FIG. 7, the binary image data 104 is a rectangle of image data with a horizontal dimension (along the X-axis) of 2w and a vertical dimension (along the Y-axis) of 2h. The origin O is positioned at the center of the binary image data 104.

The straight line 81 crosses the periphery of the binary image data 104 at the points P0 (x0,y0) and P1 (x1,y1). In other words, when the straight line 81 cuts up the binary image data 104, the two points of intersection of the straight line 81 and the periphery of the binary image data 104 are the points P0 (x0,y0) and P1 (x1,y1). The intersection distance calculation unit 161 calculates the distance between the two points of intersections, i.e. the distance between the points P0 (x0,y0) and P1 (x1,y1) (intersection distance Len).

The method of calculating a distance in the present embodiment will be specifically described. First, the method of determining the coordinates (x0,y0) of the point P0 and the coordinates (x1,y1) of the point P1 will be described. In the present embodiment, the X coordinate x0 of the point P0 is calculated from the point of intersection of the straight line 81 and straight line y=h, and the X coordinate x1 of the point P1 is calculated form the point of intersection of the straight line 81 and straight line y=−h. The Y coordinate y0 of the point P0 is calculated form the point of intersection of the straight line 81 and straight line x=w, and the Y coordinate y1 of the point P1 is calculated from the point of intersection of the straight line 81 and straight line x=−w.

First, it is supposed that the straight line 81 is parallel to the X or Y axis. Then, the intersection distance Len is calculated by the following method, without calculating the coordinates of the points P0 and P1 in the above method.

If cos θ=0, i.e. the straight line 81 is parallel to the X-axis, the intersection distance Len may be expressed in Equation 9:

[Equation 9]

$$Len = 2.0 \times w \tag{9}$$

If sin θ=0, i.e. the straight line 81 is parallel to the Y axis, the intersection distance Len may be expressed in Equation 10:

[Equation 10]

$$Len = 2.0 \times h \tag{10}$$

Next, the X coordinate x0 of the point P0, which is the point of intersection of the straight line 81 and straight line y=−h is calculated. x0 is expressed in Equation 11:

[Equation 11]

$$x0 = \frac{\rho - h \times \sin\theta}{\cos\theta} \quad (11)$$

Next, the X coordinate x1 of the point P1, which is the point of intersection of the straight line 81 and straight line y=−h, is calculated. x1 is expressed in Equation 12:

[Equation 12]

$$x1 = \frac{\rho - (-h) \times \sin\theta}{\cos\theta} \quad (12)$$

Next, the Y coordinate y0 of the point P0, which is the point of intersection of the straight line 81 and straight line x=w, is calculated. y0 is expressed in Equation 13:

[Equation 13]

$$y0 = \frac{\rho - w \times \cos\theta}{\sin\theta} \quad (13)$$

Next, the Y coordinate y1 of the point P1, which is the point of intersection of the straight line 81 and straight line x=−w, is calculated. y1 is expressed in Equation 14:

[Equation 14]

$$y1 = \frac{\rho - (-w) \times \cos\theta}{\sin\theta} \quad (14)$$

Then, if x0 is smaller than −w, x0 is −w, as shown in Equation 15. That is, if the point of intersection is outside the frame edges of the binary image, the X coordinate of the point of intersection is that of a frame edge. If the point of intersection is outside the frame edges of the binary image as measured in the X coordinate, the X coordinate is that of a frame edge in all cases, as shown in Equation 15. That is, if x0 is larger than w, x0 is equal to w. If x1 is smaller than −w, x1 is equal to −w. If x1 is larger than w, x1 is equal to w.

[Equation 15]

$$\begin{cases} x0 = -w \text{ (if } x0 < -w) \\ x0 = w \text{ (if } x0 > w) \\ x1 = -w \text{ (if } x1 < -w) \\ x1 = w \text{ (if } x1 > w) \end{cases} \quad (15)$$

If the point of intersection is outside the frame edges of the binary image as measured in the Y coordinate, the Y coordinate is that of a frame edge in all cases, as shown in Equation 16. That is, if y0 is smaller than −h, y0 is equal to −h. If y0 is larger than h, y0 is equal to h. If y1 is smaller than −h, y1 is equal to −h. If y1 is larger than h, y1 is equal to h:

[Equation 16]

$$\begin{cases} y0 = -h \text{ (if } y0 < -h) \\ y0 = h \text{ (if } y0 > h) \\ y1 = -h \text{ (if } y1 < -h) \\ y1 = h \text{ (if } y1 > h) \end{cases} \quad (16)$$

Thus, when the coordinates of the points P0 (x0,y0) and P1 (x1,y1) are determined, the intersection distance calculation unit 162 performs the operation of Equation 17 to calculate the intersection distance Len:

[Equation 17]

$$\text{Len} = \sqrt{(x0-x1)^2 + (y0-y1)^2} \quad (17)$$

In Equation 17, if x0, x1, y0 and y1 do not satisfy Equation 15 or 16, they are calculated by Equations 11 to 14; if they satisfy Equation 15 or 16, they are established by Equation 15 or 16.

Using the above calculation method, the intersection distance calculation unit 162 refers to the Hough table 15 and calculates the intersection distance Len for every value set of coordinates (θ,ρ) that is a straight line candidate. That is, the intersection distance Len is calculated for each value set of coordinates (θ,ρ) that stores a count that is not less than one in the two-dimensional array [θ][ρ]. Alternatively, the intersection distance Len may be calculated for the entire two-dimensional array [θ][ρ], including elements where the count is zero. For example, the intersection distance Len may be calculated in advance for every combination (θ,ρ), and the Len [θ][ρ] may be maintained as a lookup table.

The normalization unit 163 divides the count for each value set of coordinates (θ,ρ) by the intersection distance Len calculated for each value set of coordinates (θ,ρ) to normalize the count. The normalization unit 163 divides the count for each value set of coordinates (θ,ρ) storing a count that is not less than one in the two-dimensional array [θ][ρ] by the intersection distance Len. Alternatively, the intersection distance Len may be calculated for the entire two-dimensional array [θ][ρ], as discussed above, and every count may be normalized using the corresponding intersection distance Len. In other words, the normalization unit 163 adjusts the count for a straight line in a binary image to a value per unit length.

The straight line detection unit 16 performs both the adjustment process by the adjustment unit 161 as described in the first embodiment, and the adjustment process by the above normalization unit 163. Thus, a count in the two-dimensional array [θ][ρ] is adjusted as shown in Equation 18:

[Equation 18]

$$Tc[\theta][\rho] = \frac{T[\theta][\rho]}{Len} * f(\rho) \quad (18)$$

The adjustment equation of Equation 18 shows a combination of the adjustment process by the adjustment unit 161 according to the first embodiment and the adjustment process by the normalization unit 163. That is, the equation has the property of detecting straight lines with emphasis on those located at a particular distance from the origin, and normalizes a count using the intersection distance Len to evaluate a count per unit length.

The straight line detection unit 16 refers to the Hough table 15 adjusted by the adjustment unit 161 and normalization unit 163 and detects a straight line. The straight line detection unit 16 has a predetermined threshold used to determine a straight line (first threshold). The straight line detection unit 16 identifies, in the two-dimensional array [θ][ρ], a value set of coordinates (θ,ρ) that stores a count exceeding the first threshold. Based on the identified value set of coordinates (θ,ρ), the straight line detection unit 16 identifies a straight line contained in the binary image data 104. The straight line detection unit 16 outputs detection information. The first threshold of the present embodiment may be different from that of the first to third embodiments.

Thus, the straight line detection apparatus 1A of the present embodiment adjusts the Hough table 15 by normalizing it before detecting a straight line. Normalization is done by dividing a count in the two-dimensional array [θ][ρ] by the intersection distance Len. In the example shown in FIG. 7, the intersection distance Len of a horizontal straight line is large and that of a vertical straight line is small. Thus, a count stored in the two-dimensional array [θ][ρ] for a horizontal straight line will be divided by a larger value than in the case of a vertical straight line.

This prevents the problem that for binary image data 104, a horizontal straight line can be detected easily but a vertical straight line can be detected with difficulty. Alternatively, it may prevent the problem that a straight line near a corner of the image can be detected with difficulty. Even if the aspect ratio of an image is not 1:1, straight lines in any direction or at any position in the image can be detected using the same standard. Further, the adjustments using the function f(x) make straight line detection possible with emphasis on straight lines located at a particular distance from the origin.

Fifth Embodiment

Next, a fifth embodiment of the present embodiment will be described. In the fourth embodiment illustrated above, the adjustment process of the first embodiment and the adjustment process by the normalization unit 163 are combined. In the fifth embodiment, the adjustment process of the second embodiment and the adjustment process by the normalization unit 163 are combined.

Equation 19 shows an adjustment equation according to the fifth embodiment:

[Equation 19]

$$Tc[\theta][\rho] = \frac{T[\theta][\rho]}{Len} * g(\theta) \qquad (19)$$

Thus, a count in the two-dimensional array [θ][ρ] is divided by the intersection distance Len and thus normalized, and adjusted by the function g(x). That is, in the fifth embodiment, a count is normalized using the intersection distance Len, and straight lines may be detected with emphasis on a particular slope.

Sixth Embodiment

Next, a sixth embodiment of the present embodiment will be described. The sixth embodiment combines the adjustment process of the first embodiment, the adjustment process of the second embodiment and the adjustment process by the normalization unit 163.

Equation 20 shows an adjustment equation according to the sixth embodiment:

[Equation 20]

$$Tc[\theta][\rho] = \frac{T[\theta][\rho]}{Len} * f(\rho) * g(\theta) \qquad (20)$$

Thus, a count in the two-dimensional array [θ][ρ] is divided by the intersection distance Len and thus normalized, and adjusted by the functions f(x) and g(x). That is, in the sixth embodiment, a count is normalized using the intersection distance Len, and straight lines may be detected with emphasis on a particular distance from the origin and a particular slope.

Seventh Embodiment

Next, a seventh embodiment of the present invention will be described. A straight line detection apparatus 1A of the seventh embodiment can be represented by the same functional block as that shown in FIG. 6. However, the seventh embodiment is different from the fourth to sixth embodiments in the process by the straight line detection unit 16.

In the fourth to sixth embodiments, a count for each value set of coordinates (θ,ρ) in the Hough space is divided by the intersection distance Len and normalized. That is, a normalized count is calculated for every straight line candidate and is compared with a first threshold.

In the seventh embodiment, straight lines with an intersection distance Len below a predetermined threshold (second threshold) are excluded from straight line detection. For example, straight lines located near a corner of the binary image data 104 and having a small intersection distance Len are excluded from detection. This may prevent dots on a straight line that have a small density but have a very small intersection distance Len and thus have an increased normalized count from being falsely recognized as a straight line. Alternatively, it may prevent a large number of straight lines having a very small length near a corner of an image from being detected.

For example, if information regarding a corner of an image is not considered very important, the second threshold may be relatively large such that focus is placed on an area near the center of the image in detecting a straight line.

Eighth Embodiment

Next, an eight embodiment of the present invention will be described. The straight line detection apparatus 1A of the eight embodiment can be represented by the same functional block as that shown in FIG. 6. However, the eight embodiment is different from the fourth to sixth embodiments in the process by the straight line detection unit 16.

In the fourth to sixth embodiments, the coordinates of the points P0 and P1 are determined by the method shown in Equations 11 to 14 to calculate the intersection distance Len. In the eight embodiment, the intersection distance Len is calculated where the distance between the straight line and the origin O is zero.

That is, when calculating the intersection distance Len of a straight line in a binary image that corresponds to a value set of coordinates (θ,ρ), the intersection distance calculation unit 162 replaces ρ by zero before calculating the intersection distance Len.

Calculating the intersection distance Len in this way reduces the amount of operation of the intersection distance calculation unit 162, thereby increasing the process speed. Specifically, p is replaced by zero in Equations 11 to 14, thereby simplifying the equations.

Ninth Embodiment

Figure 8:
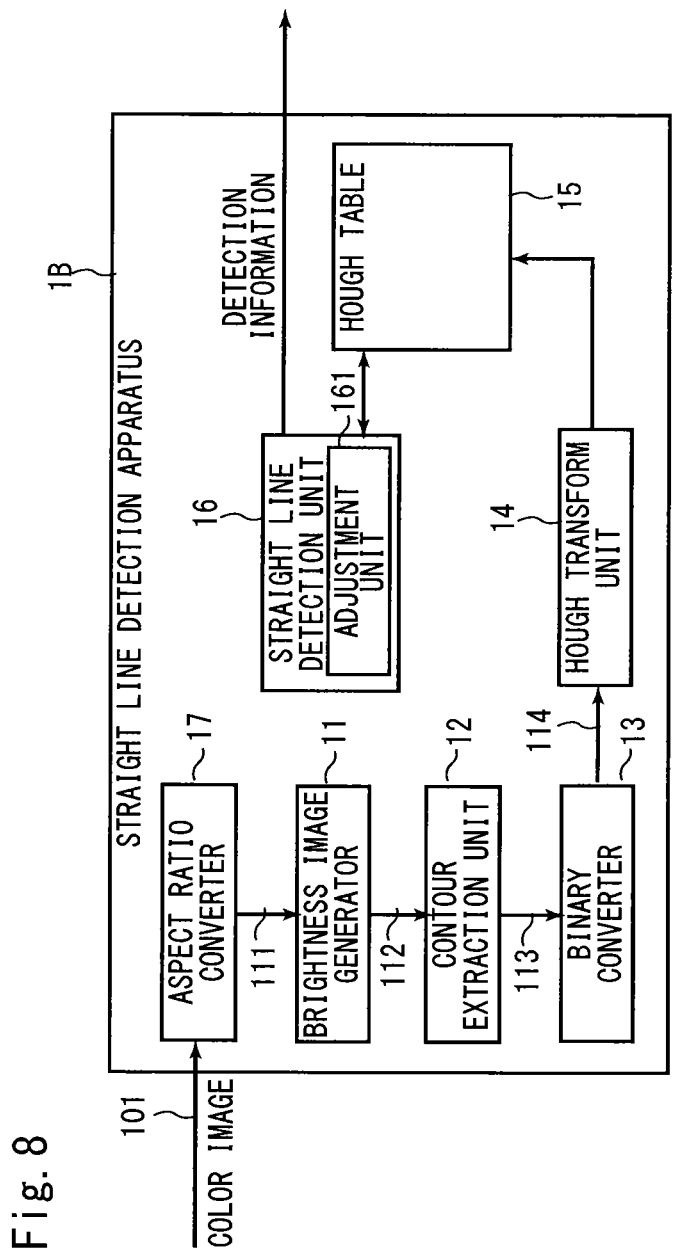
FIG. 8 is a block diagram of a straight line detection apparatus according to an eighth embodiment.

Next, a ninth embodiment of the present invention will be described. FIG. 8 is a block diagram of a straight line detection apparatus 1B according to the ninth embodiment.

Similar to the straight line detection apparatus 1A of the fourth embodiment, the straight line determines apparatus 1B of the ninth embodiment includes a brightness image generator 11, contour extraction unit 12, binary converter 13, Hough transform unit 14, and Hough table 15. The functions of these functional units are the same as those of the fourth to sixth embodiments.

The straight line detection unit 16 of the ninth embodiment is different from those of the fourth to sixth embodiments in that it does not include the intersection distance calculation unit 162 and normalization unit 163. In the ninth embodiment, the straight line detection unit 16 detects a straight line without normalizing the Hough table 15.

The straight line detection apparatus 1B includes an aspect ratio converter 17. The aspect ratio converter 17 receives a color image 101 and converts the color image to a square color image with an aspect ratio of 1:1. When the aspect ratio is changed, the image must be scaled up or down. While the scaling-up is not limited to a particular method, the image may be scaled up using linear interpolation, for example. If the image is to be scaled down, the image may be thinned, for example. Even when the aspect ratio is changed, a straight line is converted to a straight line.

The brightness image generator 11, contour extraction unit 12, binary converter 13, and Hough transform unit 14 perform the same processes as those of the fourth to sixth embodiments. The processes are performed on a converted square image with an aspect ratio of 1:1.

The Hough table 15 provides a count for a value set of coordinates (θ,ρ) after conversion by the Hough converter 14, using a two-dimensional array [θ][ρ]. The count is adjusted by the adjustment unit 161. Specifically, similar to the fourth to sixth embodiments, the functions for weighting f(x) and g(x), for example, may be used to adjust the count.

The straight line detection unit 16 has a predetermined threshold used to determine a straight line (first threshold). The straight line detection unit 16 identifies, in the two-dimensional array [θ][ρ], a value set of coordinates (θ,ρ) that stores a count exceeding the first threshold. Based on the identified value set of coordinates (θ,ρ), the straight line detection unit 16 identifies a straight line contained in the binary image data 104. The straight line detection unit 16 outputs detection information. The first threshold may be different from that of the fourth to sixth embodiments.

Thus, the straight line detection apparatus 1B of the present embodiment converts the aspect ratio to 1:1 before performing the Hough transform. This solves the problem that the likelihood of straight line detection is different depending on its direction in the image.

In the present embodiment, the aspect ratio is converted before generating a brightness image. However, aspect ratio conversion may occur at any time prior to the Hough transform being performed. For example, aspect ratio conversion may occur after brightness image generation, after contour extraction, or after binary conversion. A straight line detected in a square image is converted to a straight line contained in the color image 101 by operations that convert the aspect ratio back to its original value.

Tenth Embodiment

Figure 9:
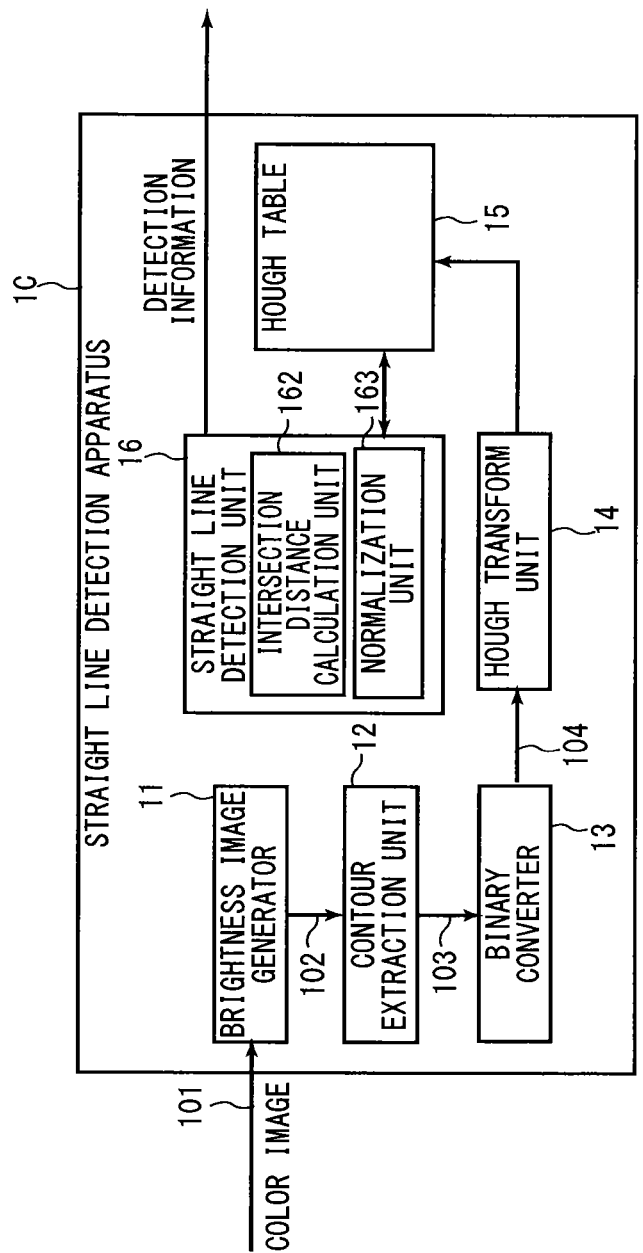
FIG. 9 is a block diagram of a straight line detection apparatus according to a tenth embodiment.

Next, a tenth embodiment of the present invention will be described. FIG. 9 is a functional block diagram of a straight line detection apparatus 1C according to the tenth embodiment. Similar to the straight line detection apparatus 1A of the fourth embodiment of FIG. 6, the straight line detection apparatus 1C of the tenth embodiment includes a brightness image generator 11, contour extraction unit 12, binary converter 13, Hough transform unit 14 and Hough table 15. The functions of these functional units are similar to those of the fourth to sixth embodiments.

The straight line detection apparatus 1C is different from the straight line detection apparatus 1A of the fourth embodiment in the configuration of the straight line detection unit 16. The straight line detection unit 16 of the straight line detection apparatus 1C includes an intersection distance calculation unit 162 and a normalization unit 163 similar to those of the fourth embodiment, but does not include an adjustment unit 161. The adjustment of the Hough table 15 is only performed by the intersection distance calculation unit 162 and normalization unit 163.

Using a calculation method similar to that of the fourth embodiment, the intersection distance calculation unit 162 refers to the Hough table 15 and calculates the intersection distance Len for every value set of coordinates (θ,ρ) that is a straight line candidate. That is, the intersection distance Len is calculated for each value set of coordinates (θ,ρ) that stores a count that is not less than one in the two-dimensional array [θ][ρ]. Alternatively, the intersection distance Len may be calculated for the entire two-dimensional array [θ][ρ], including elements where the count is zero. For example, the intersection distance Len may be calculated in advance for every combination (θ,ρ), and the Len [θ][ρ] may be maintained as a lookup table.

The normalization unit 163 divides the count for each value set of coordinates (θ,ρ) by the intersection distance Len calculated for each value set of coordinates (θ,ρ) to normalize the count. The normalization unit 163 divides the count for each value set of coordinates (θ,ρ) storing a count that is not less than one in the two-dimensional array [θ][ρ] by the intersection distance Len. Alternatively, the intersection distance Len may be calculated for the entire two-dimensional array [θ][ρ], as discussed above, and every count may be normalized using the corresponding intersection distance Len. In other words, the normalization unit 163 adjusts the count for a straight line in a binary image to a value per unit length. Thus, the adjustment of the Hough table 15 (the two-dimensional array [θ][ρ]) is completed.

The straight line detection unit 16 refers to the Hough table 15 adjusted by the adjustment unit 161 and detects a straight line. The straight line detection unit 16 has a predetermined threshold used to determine a straight line (first threshold). The straight line detection unit 16 identifies, in the two-dimensional array [θ][ρ], a value set of coordinates (θ,ρ) that stores a count exceeding the first threshold. Based on the identified value set of coordinates (θ,ρ), the straight line detection unit 16 identifies a straight line contained in the binary image data 104. The straight line detection unit 16 outputs detection information. The first threshold of the present embodiment may be different from that of the first to ninth embodiments.

Thus, the straight line detection apparatus 1C of the present embodiment adjusts the Hough table 15 by normalizing it before detecting a straight line. Normalization is done by dividing a count in the two-dimensional array [θ][ρ] by the intersection distance Len. In the example shown in FIG. 7, the intersection distance Len of a horizontal straight line is large and that of a vertical straight line is small. Thus, a count stored in the two-dimensional array [θ][ρ] for a horizontal straight line will be divided by a larger value than in the case of a vertical straight line.

This prevents the problem that for binary image data 104, a horizontal straight line can be detected easily but a vertical straight line can be detected with difficulty. Alternatively, it may prevent the problem that a straight line near a corner of the image can be detected with difficulty. Even if the aspect ratio of an image is not 1:1, straight lines in any direction or at any position in the image can be detected using the same standard.

Eleventh Embodiment

Next, an eleventh embodiment of the present invention will be described. A straight line detection apparatus of the eleventh embodiment can be represented by the same functional block as that shown in FIG. 9. However, the eleventh embodiment is different from the tenth embodiment in the processes by the straight line detection unit 16.

In the tenth embodiment, a count for each value set of coordinates (θ,ρ) in the Hough space is divided by the intersection distance Len and normalized. That is, a normalized count is calculated for every straight line candidate and is compared with a first threshold.

In the eleventh embodiment, straight lines with an intersection distance Len below a predetermined threshold (second threshold) are excluded from straight line detection. For example, straight lines located near a corner of the binary image data 104 and having a small intersection distance Len are excluded from detection. This may prevent dots on a straight line that have a small density but have a very small intersection distance Len and thus have an increased normalized count from being falsely recognized as a straight line. Alternatively, it may prevent a large number of straight lines having a very small length near a corner of an image from being detected.

For example, if information regarding a corner of an image is not considered very important, the second threshold may be relatively large such that focus is placed on an area near the center of the image in detecting a straight line.

Twelfth Embodiment

Next, a twelfth embodiment of the present invention will be described. A straight line detection apparatus of the twelfth embodiment can be represented by the same functional block as that shown in FIG. 9. However, the twelfth embodiment is different from the tenth embodiment in the process by the straight line detection unit 16.

In the tenth embodiment, similar to the fourth embodiment, the coordinates of the points P0 and P1 are determined by the method shown in Equations 11 to 14 to calculate the intersection distance Len. In the twelfth embodiment, the intersection distance Len is calculated where the distance between the straight line and the origin O is zero.

That is, when calculating the intersection distance Len of a straight line in a binary image that corresponds to a value set of coordinates (θ,ρ), the intersection distance calculation unit 162 replaces ρ by zero before calculating the intersection distance Len.

Calculating the intersection distance Len in this way reduces the amount of operation of the intersection distance calculation unit 161, thereby increasing the process speed. Specifically, p is replaced by zero in Equations 11 to 14, thereby simplifying the equations.

Thirteenth Embodiment

Figure 10:
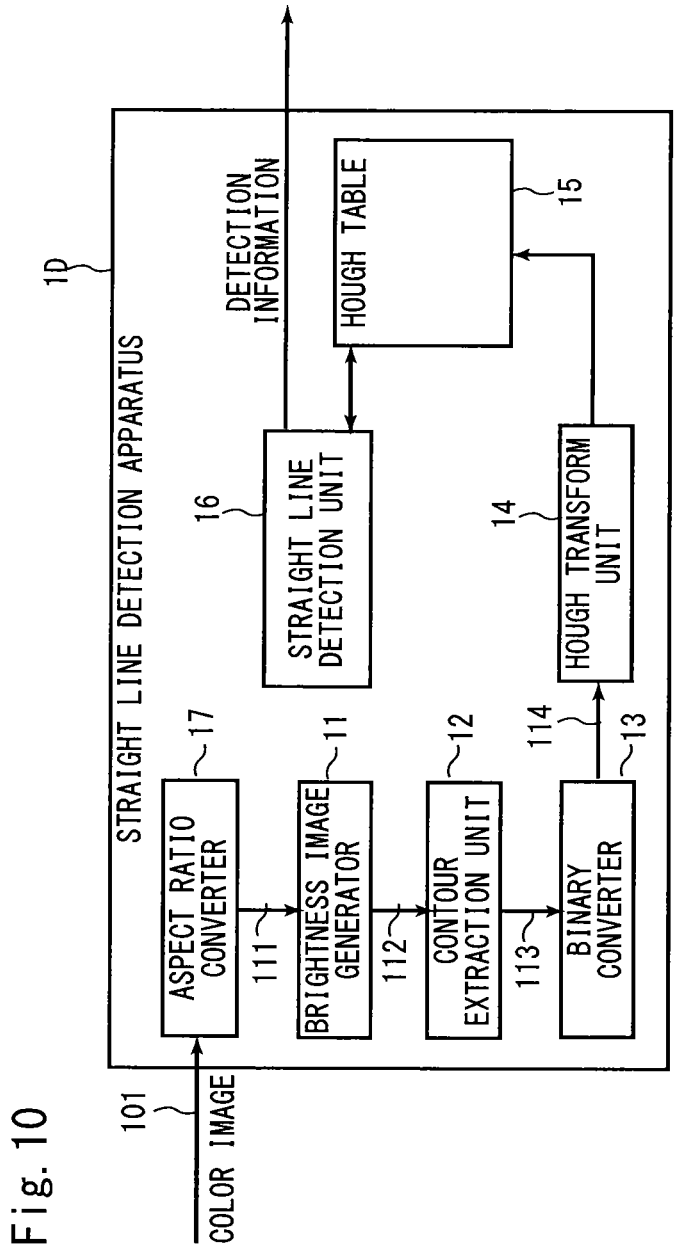
FIG. 10 is a block diagram of a straight line detection apparatus according to a thirteenth embodiment.

Next, a thirteenth embodiment of the present invention will be described. FIG. 10 is a block diagram of a straight line detection apparatus 1D according to the thirteenth embodiment.

Similar to the straight line detection apparatus 1 of the tenth embodiment, the straight line detection apparatus 1D of the thirteenth embodiment includes a brightness image generator 11, contour extraction unit 12, binary converter 13, Hough transform unit 14 and Hough table 15. The functions of these functional units are similar to those of the first embodiment.

The straight line detection unit 16 of the thirteenth embodiment is different from that of the tenth embodiment in that it does not include the intersection distance calculation unit 162 and normalization unit 163. In the thirteenth embodiment, the straight line detection unit 16 detects a straight line without normalizing the Hough table 15.

The straight line detection apparatus 1D includes an aspect ratio converter 17. The aspect ratio converter 17 receives a color image 101 and converts the color image to a square color image with an aspect ratio of 1:1. When the aspect ratio is changed, the image must be scaled up or down. While the scaling-up is not limited to a particular method, the image may be scaled up using linear interpolation, for example. If the image is to be scaled down, the image may be thinned, for example. Even when the aspect ratio is changed, a straight line is converted to a straight line.

The brightness image generator 11, contour extraction unit 12, binary converter 13, and Hough transform unit 14 perform the same processes as those of the first embodiment. The processes are performed on a converted square image with an aspect ratio of 1:1.

The Hough table 15 provides a count for a value set of coordinates (θ,ρ) after conversion by the Hough converter 14, using a two-dimensional array [θ][ρ]. The straight line detection unit 16 has a predetermined threshold used to determine a straight line (first threshold). The straight line detection unit 16 identifies, in the two-dimensional array [θ][ρ], a value set of coordinates (θ,ρ) that stores a count exceeding the first threshold. Based on the identified value set of coordinates (θ,ρ), the straight line detection unit 16 identifies a straight line contained in the binary image data 104. The straight line detection unit 16 outputs detection information. The first threshold may be different from that of the tenth embodiment.

Thus, the straight line detection apparatus 1D of the present embodiment converts the aspect ratio to 1:1 before performing the Hough transform. This solves the problem that the likelihood of straight line detection is different depending on its direction in the image.

In the present embodiment, the aspect ratio is converted before generating a brightness image. However, aspect ratio conversion may occur at any time prior to the Hough transform being performed. For example, aspect ratio conversion may occur after brightness image generation, after contour extraction, or after binary conversion. A straight line detected in a square image is converted to a straight line contained in the color image 101 by operations that convert the aspect ratio back to its original value.

Fourteenth Embodiment

In the above embodiments, an image is binarized prior to the Hough transform being performed. In the fourteenth embodiment, an image is not binarized. An image includes multiple values, such as 0-255.

A straight line detection apparatus of the fourteenth embodiment can be represented by the same block diagram as that for the straight line detection apparatus 1 or 1A to 1D of FIG. 1, 6, or 8 to 10. However, the straight line detection apparatus of the fourteenth embodiment does not include the binary converter 13.

The Hough transform unit 14 performs the Hough transform on all the points contained in the contour image data 103 or 113. The points contained in the contour image data 103 or 113 include multiple pixel values such as 0-255, and the Hough transform is performed on all these points.

In the above embodiments, the Hough transform unit 14 stores, in the two-variable array [θ][ρ], the number of times the Hough transform is performed on points contained in the binary image data 104 or 114. In other words, if the Hough transform results in a value set of coordinates (θ,ρ) N times, the count stored in the two-variable array [θ][ρ] is N.

In the fourteenth embodiment, a value dependent on the strength of the line segment of points contained in the contour image data 103 or 113 is stored in the two-variable array [θ][ρ]. For example, a pixel value may be added to the two-variable array [θ][ρ] to provide a count. Alternatively, a pixel value may be converted in a predetermined manner and the resulting value may be added to the two-variable array [θ][ρ]. That is, weighting is performed depending on the magnitude of the amount of characteristic of the pixel before counting the number of conversions in the two-variable array [θ][ρ].

The subsequent processes are the same as those of the above embodiments. The count is adjusted by at least one of the weighting function f(x) and g(x), or normalized. Alternatively, the count is adjusted by at least one of the weighting function f(x) and g(x) and then normalized. Thereafter, the count is compared with a threshold. According to the fourteenth embodiment, binarization is not done, which is advantageous when a straight line with a relatively small strength is to be detected, for example.

{Variation 2}

In the first to thirteenth embodiments, the center of the binary image data 104 is represented by the origin and straight lines in the binary image data 104 are represented by θ and ρ. Alternatively, the origin may represent any location in the image. Still alternatively, the origin may represent a location outside the frame of the binary image data 104.

In the first to thirteenth embodiments, binarization is performed after contour extraction. Contour extraction is one example of a process for extracting an amount of characteristic of an image. Binarization may be performed after an amount of characteristic of an image is extracted by other methods.

While the present invention has been illustrated with reference to the embodiments shown in the attached drawings, the present invention is not limited by the detailed description unless specifically stated, and should be construed broadly as defined by the Claims.

The invention claimed is:

1. A straight line detection apparatus comprising:
a Hough transform part configured to convert a straight line that passes through an arbitrary point in a specified image to a value set of coordinates (θ,ρ) in a Hough space by representing an arbitrary straight line in the specified image using a length ρ of a perpendicular extending from a reference point of the specified image to the arbitrary straight line in the specified image and an angle θ formed by the perpendicular with a reference axis that passes through the reference point;
a counting part configured to count a number of conversions by the Hough transform part for each value set of coordinates (θ,ρ) in the Hough space;
an adjustment part configured to adjust a count for each value set of coordinates (θ,ρ) by means of weighting depending on at least one of ρ and θ; and
a detection part configured to detect the straight line in the specified image by identifying a value set of coordinates (θ,ρ) for which the adjusted count exceeds a first threshold.

2. The straight line detection apparatus according to claim 1, wherein, when weighting is performed depending on a value of ρ, the adjustment part performs weighting so as to highly evaluate the count for a vicinity of one or more values of ρ, and when weighting is performed depending on a value of θ, the adjustment part performs weighting so as to highly evaluate the count for a vicinity of one or more values of θ.

3. The straight line detection apparatus according to claim 1, further comprising:
an intersection distance calculation part configured to determine points of intersection where a straight line in the specified image corresponding to an arbitrary value set of coordinates (θ,ρ) in the Hough space crosses a periphery of the specified image and calculate a distance between these points of intersection; and
a normalization part configured to normalize the count adjusted by the adjustment part using the intersection distance,
wherein the detection part detects the straight line in the specified image by identifying a value set of coordinates (θ,ρ) for which the normalized count exceeds the first threshold.

4. The straight line detection apparatus according to claim 1, further comprising:
an aspect ratio conversion part configured to perform aspect ratio conversion to convert an aspect ratio of a specified image before the Hough transform to 1:1 to generate a square image.

5. The straight line detection apparatus according to claim 1, further comprising:
a binary conversion part configured to perform binary conversion on the specified image prior to the Hough transform being performed,
wherein, when a point in the specified image is converted to a value set of coordinates (θ,ρ) in the Hough space, one is added to the count.

6. The straight line detection apparatus according to claim 1, wherein, when each point in the specified image is converted to a value set of coordinates (θ,ρ) in the Hough space, a value weighted by a magnitude of an amount of characteristic of that point in the specified image is added to the count.

7. The straight line detection apparatus according to claim 6, wherein the magnitude of the amount of characteristic includes a strength of a line segment.

8. The straight line detection apparatus according to claim 1, wherein the reference point has arbitrary coordinates in the specified image.

9. The straight line detection apparatus according to claim 1, further comprising a brightness image generation part configured to generate, if the specified image is a color image, a brightness image from the color image prior to the Hough transform being performed.

10. The straight line detection apparatus according to claim 5, wherein the binary conversion is performed after a characteristic amount extraction process is performed on the specified image.

11. The straight line detection apparatus according to claim 10, wherein the characteristic amount extraction process includes a contour extraction process.

12. The straight line detection apparatus according to claim 3, wherein the detection part excludes a straight line with an intersection distance not more than a second threshold from straight line detection regardless of a value of the normalized count.

13. The straight line detection apparatus according to claim 3, wherein the intersection distance calculation part includes a simple calculation part configured to calculate the intersection distance of a straight line in the specified image corresponding to a value set of coordinates $(\theta,\rho)$ in the Hough space after replacing $\rho$ by zero.

14. A straight line detection apparatus comprising:
   a Hough transform part configured to convert a straight line that passes through an arbitrary point in a specified image to a value set of coordinates $(\theta,\rho)$ in a Hough space by representing an arbitrary straight line in the specified image using a length $\rho$ of a perpendicular extending from a reference point of the specified image to the arbitrary straight line in the specified image and an angle $\theta$ formed by the perpendicular with a reference axis that passes through the reference point;
   an intersection distance calculation part configured to determine points of intersection where a straight line in the specified image corresponding to an arbitrary value set of coordinates $(\theta,\rho)$ in the Hough space crosses a periphery of the specified image and calculate a distance between these points of intersection;
   a normalization part configured to count a number of conversions by the Hough transform part for each value set of coordinates $(\theta,\rho)$ in the Hough space and normalize a count for each value set of coordinates $(\theta,\rho)$ using a corresponding intersection distance to calculate a normalized count; and
   a detection part configured to detect the straight line in the specified image by identifying a value set of coordinates $(\theta,\rho)$ for which the normalized count exceeds a first threshold.

15. The straight line detection apparatus according to claim 14, wherein the detection part excludes a straight line with an intersection distance not more than a second threshold from straight line detection regardless of a value of the normalized count.

16. The straight line detection apparatus according to claim 14, wherein the intersection distance calculation part includes a simple calculation part configured to calculate the intersection distance of a straight line in the specified image corresponding to a value set of coordinates $(\theta,\rho)$ in the Hough space after replacing $\rho$ by zero.

17. The straight line detection apparatus according to claim 14, further comprising:
   a binary conversion part configured to perform binary conversion on the specified image prior to the Hough transform being performed,
   wherein, when a point in the specified image is converted to a value set of coordinates $(\theta,\rho)$ in the Hough space, one is added to the count.

18. The straight line detection apparatus according to claim 14, wherein, when each point in the specified image is converted to a value set of coordinates $(\theta,\rho)$ in the Hough space, a value weighted by a magnitude of an amount of characteristic of that point in the specified image is added to the count.

19. The straight line detection apparatus according to claim 18, wherein the magnitude of the amount of characteristic includes a strength of a line segment.

20. The straight line detection apparatus according to claim 14, wherein the reference point has arbitrary coordinates in the specified image.

21. The straight line detection apparatus according to claim 14, further comprising a brightness image generation part configured to generate, if the specified image is a color image, a brightness image from the color image prior to the Hough transform being performed.

22. A straight line detection apparatus comprising:
   an aspect ratio conversion part configured to perform aspect ratio conversion to convert an aspect ratio of a specified image to 1:1 to generate a square image;
   a Hough transform part configured to convert a straight line that passes through an arbitrary point in the square image to a value set of coordinates $(\theta,\rho)$ in a Hough space by representing an arbitrary straight line in the square image using a length $\rho$ of a perpendicular extending from a reference point of the square image to the arbitrary straight line in the square image and an angle $\theta$ formed by the perpendicular with a reference axis that passes through the reference point; and
   a detection part configured to count a number of conversions by the Hough transform part for each value set of coordinates $(\theta,\rho)$ in the Hough space and detect the straight line in the square image by identifying a value set of coordinates $(\theta,\rho)$ for which the count for that value set of coordinates $(\theta,\rho)$ exceeds a first threshold.

23. The straight line detection apparatus according to claim 22, further comprising:
   a binary conversion part configured to perform binary conversion on an image prior to the Hough transform being performed and before or after the aspect ratio conversion,
   wherein, when a point in the square image is converted to a value set of coordinates $(\theta,\rho)$ in the Hough space, one is added to the count.

24. The straight line detection apparatus according to claim 22, wherein, when each point in the square image is converted to a value set of coordinates $(\theta,\rho)$ in the Hough space, a value weighted by a magnitude of an amount of characteristic of that point in the square image is added to the count.

25. The straight line detection apparatus according to claim 24, wherein the magnitude of the amount of characteristic includes a strength of a line segment.

26. The straight line detection apparatus according to claim 22, wherein the reference point has arbitrary coordinates in the square image.

27. The straight line detection apparatus according to claim 23, wherein the binary conversion is performed after a characteristic amount extraction process is performed on the specified image.

28. The straight line detection apparatus according to claim 27, wherein the characteristic amount extraction process includes a contour extraction process.

29. The straight line detection apparatus according to claim 22, further comprising a brightness image generation part configured to generate, if the specified image is a color image, a brightness image from the color image prior to the Hough transform being performed.

30. A straight line detection method comprising:
- (a) a Hough transform step to convert, with a processor, a straight line that passes through an arbitrary point in a specified image to a value set of coordinates $(\theta,\rho)$ in a Hough space by representing an arbitrary straight line in the specified image using a length $\rho$ of a perpendicular extending from a reference point of the specified image to the arbitrary straight line in the specified image and an angle $\theta$ formed by the perpendicular with a reference axis that passes through the reference point;
- (b) a counting step to count, with a processor, a number of conversions in the Hough transform step for each value set of coordinates $(\theta,\rho)$ in the Hough space;
- (c) an adjustment step to adjust, with a processor, a count for each value set of coordinates $(\theta,\rho)$ by means of weighting depending on at least one of $\rho$ and $\theta$; and
- (d) a detection step to detect the straight line in the specified image by identifying a value set of coordinates $(\theta,\rho)$ for which the adjusted count exceeds a first threshold.

31. A straight line detection method comprising:
- (a) a Hough transform step to convert, with a processor, a straight line that passes through an arbitrary point in a specified image to a value set of coordinates $(\theta,\rho)$ in a Hough space by representing an arbitrary straight line in the specified image using a length $\rho$ of a perpendicular extending from a reference point of the specified image to the arbitrary straight line in the specified image and an angle $\theta$ formed by the perpendicular with a reference axis that passes through the reference point;
- (b) an intersection distance calculation step to determine points of intersection where a straight line in the specified image corresponding to an arbitrary value set of coordinates $(\theta,\rho)$ in the Hough space crosses a periphery of the specified image and calculate a distance between these points of intersection;
- (c) a normalization step to count a number of conversions in the Hough transform step for each value set of coordinates $(\theta,\rho)$ in the Hough space and normalize a count for each value set of coordinates $(\theta,\rho)$ using a corresponding intersection distance to calculate a normalized count with a processor; and
- (d) a detection step to detect the straight line in the specified image by identifying a value set of coordinates $(\theta,\rho)$ for which the normalized count exceeds a first threshold.

32. A straight line detection method comprising:
- (a) a conversion step to perform, with a processor, aspect ratio conversion to convert an aspect ratio of a specified image to 1:1 to generate a square image;
- (b) a Hough transform step to convert, with a processor, a straight line that passes through an arbitrary point in the square image to a value set of coordinates $(\theta,\rho)$ in a Hough space by representing an arbitrary straight line in the square image using a length $\rho$ of a perpendicular extending from a reference point of the square image to the arbitrary straight line in the square image and an angle $\theta$ formed by the perpendicular with a reference axis that passes through the reference point; and
- (c) a detection step to count, with a processor, a number of conversions in the Hough transform step for each value set of coordinates $(\theta,\rho)$ in the Hough space and detect the straight line in the square image by identifying a value set of coordinates $(\theta,\rho)$ for which the count for that value set of coordinates $(\theta,\rho)$ exceeds a first threshold.

* * * * *